United States Patent

[11] 3,622,546

[72] Inventors Fritz Engelhardt
 Frankfurt-Fechenheim;
 Hanswilli von Brachel, Offenbach; Wilhelm Kunze, Frankfurt-Fechenheim, all of Germany
[21] Appl. No. 734,176
[22] Filed June 3, 1968
[45] Patented Nov. 23, 1971
[73] Assignee Cassella Farbwerke Mainkur Aktiengesellschaft
 Frankfurt, Germany
[32] Priority June 3, 1967
[33] Germany
[31] C 42530

[54] UNSATURATED ESTERS OF POLYMERS AND THEIR PREPARATION
 7 Claims, No Drawings

[52] U.S. Cl................................................. 260/78.5,
 117/148, 260/78.4, 260/80, 260/80.3, 260/82.1,
 260/85.5, 260/85.7, 260/86.1, 260/87.5, 260/87.7,
 260/88.1

[51] Int. Cl....................................................... C08f 3/64,
 C08f 3/66, C08f 19/10
[50] Field of Search............................................ 260/78.4,
 80 P, 80.3, 78.5 T

[56] References Cited
UNITED STATES PATENTS
3,441,545 4/1969 Blatz ............................ 260/78.5
FOREIGN PATENTS
1,224,773 9/1966 Germany...................... 260/469
OTHER REFERENCES
Royals, E.E., Advance Organic Chem., Prentice Hall (N.J.), 1959, p. 604, 605.

*Primary Examiner*—Joseph L. Schofer
*Assistant Examiner*—C. A. Henderson, Jr.
*Attorney*—Connolly and Hutz ABSTRACT: An allyl or methallyl ester of a carboxyl-containing polymer is prepared by reacting a polymer containing carboxyl groups, in the form of an alkali metal salt, with an alkenyl halide in the presence of a cuprous salt catalyst.

UNSATURATED ESTERS OF POLYMERS AND THEIR PREPARATION

This invention relates to a process of preparing allyl or methallyl esters of polymers which contain carboxyl groups. More particularly, it relates to a process of esterifying a polymer containing one or more carboxyl groups by reacting said polymer, in the form of an alkali metal salt with an alkenyl halide in the presence of a cuprous salt.

It is known in the art that allyl esters of unsaturated carboxylic esters can be polymerized. However, due to two or more carbon-carbon double bonds present, cross-linked polymers form very easily during the polymerization of these compounds. By adding inert monomers, the risk of cross-linkage may be diminished to a certain degree; even so, the process is difficult to handle from a technical point of view.

From German document 1,224,735 laid open to public inspection it is known that allyl esters of monomolecular carboxylic acids may be prepared by reacting their sodium salts with allyl chloride, employing cuprous salts as catalysts, but it could not be seen from this document that this reaction would also be applicable to high-molecular, polymer carboxylic acids. Rather a reaction that is more complicated had to be faced, since it is known that the conduct of esterification reactions and other reactions of the carboxyl group in macromolecules, unlike the corresponding reactions with monomolecular compounds, is more difficult and quite incomplete. Moreover, it was foreseeable that the copper salts could not be removed from the polymers and would give rise to discoloration of the polymers.

We now have found that polymers containing carboxyl groups can be esterified with alkenyl halides, by reacting the alkali metal salts of these polymers in an aqueous medium and in the presence of cuprous salts with the alkenyl halides, particularly with allyl and methallyl chloride.

This reaction is most advantageously effected in an aqueous solution in which case organic solvents which are water-immiscible are most suitably added.

Polymers containing carboxyl groups include the homopolymers and copolymers of unsaturated monocarboxylic acids, such as acrylic acid, methacrylic acid and crotonic acid, or of unsaturated dicarboxylic acids such as maleic acid, fumaric acid, endomethylene tetrahydro benzoic acid, and itaconic acid, as well as anhydrides, monoesters and monoamides of these dicarboxylic acids.

Comonomers which may be employed in preparing copolymers of the above-mentioned unsaturated acids are, for example: styrene and its substitution products, such as α-methyl styrene, vinyl toluene, and chlorostyrene; dienes, such as butadiene, isoprene, dimethyl butadiene; esters of the above unsaturated acids with lower and higher alcohols, such as methyl, ethyl, butyl, isobutyl, ethylhexyl, and hydroxy-alkyl acrylates and methacrylates, as well as fumaric acid mono- and/or dimethyl, dibutyl, diethylhexyl esters; nitriles such as acrylonitrile and methacrylonitrile; amides such as acrylamide, methacrylamide and tertiary-butyl acrylamide; vinyl esters such as vinyl acetate, vinyl propionate and vinyl hexylate; vinyl ethers such as vinyl methyl ether, vinyl butyl ether and vinyl cyclohexyl ether; halogeno olefines such as vinyl chloride and vinylidene chloride; also olefines such as propylene, isobutylene, dipentene and dicyclopentadiene.

The following alkenyl halides can be employed in the claimed process, for example: allyl chloride, bromide or iodide, methallyl chloride or bromide, the adducts of hydrogen chloride or bromide to butadiene, isoprene, 2,3-dimethyl butadiene, 1- or 3-bromo hexene. As cuprous salts can be used, for instance, cuprous chloride, bromide, iodide or cyanide. It is advisable to add small quantities of metallic copper to the cuprous salts to avoid an oxidation to cupric compounds. Apart from the sodium salts, the potassium salts are preferably used as alkali metal salts of the polymers.

It is surprising how easily a complete esterification of the carboxyl groups, for example with allyl chloride or methallyl chloride, can be achieved.

The polymer containing carboxyl groups is employed in the form of the alkali metal salt, preferably in an aqueous solution or suspension and is most suitably reacted with stoichiometrical amounts of the alkenyl halide at temperatures between 20 and 80° C. with the addition of, as is generally done, 0.01–5 percent of the cuprous catalyst. In the event that the reaction becomes more complicated, alternatively an excess of alkenyl halide may be used.

If the alkenyl esters obtained are water-insoluble, it is advisable to add a solvent wherein the polymer esters dissolve.

In general, the reaction is run at a pH of 1–8, preferentially however, at a pH of 4–8.

With regard to yield and purity of the polymers, a working method proves to be especially advantageous which consists in adjusting, after the completed reaction in the aqueous medium the pH-value to 1–2 by adding dilute acids, or in carrying on the reaction until this pH-value is reached. Under these conditions the copper salts alone remain dissolved in the aqueous phase and the polymer is obtained free from copper salts so that its separation does not cause any difficulties. Thus, the copper salts do not have adverse effects on the color of the polymer.

Should the copolymer to be reacted contain anhydride components the esterification may also be effected in two steps, by first reacting the copolymer with a saturated or an unsaturated alcohol, such as allyl or methallyl alcohol, to form acid esters, and by reacting these esters in the form of their alkali metal salts with the corresponding alkenyl halide. This method permits variations to a great extent, since the most diversified alcohols may be employed in step 1 and since, after the subsequent reaction according to the present invention, mixed esters may also be obtained in step 2.

There is a wide range of application for the alkenyl esters of polymers containing carboxyl groups thus prepared. They may, for instance, be used as air-drying lacquers, or may be combined with vulcanizing agents and peroxides for the preparation of molding resins and fillers or for the coating of wood and chip boards.

The following examples are to illustrate the present invention, but by no means limit the scope thereof. The percentages mentioned therein are by weight and the temperatures are in degrees centigrade.

EXAMPLE 1

Polyallyl acrylate

In a multineck flask equipped with a stirrer, reflux condenser, thermometer and pH-meter, 72 g. (1 mole) polyacrylic acid in 222 g. (1 mole) aqueous potassium hydroxide of 25 percent concentration are dissolved with stirring and the resultant high-viscous solution is diluted with 400 cc. distilled water. The pH-value of this solution is 7.8. After having admixed the solution with 50 g. sodium hydrogen carbonate as buffer, the pH-value adjusts itself to 8.4. Then 0.2 g. copper powder and 1.5 g. cuprous chloride are added as catalysts and 114 g. (1.5 mole) allyl chloride are introduced with stirring. The reaction temperature is kept at 40° and only towards the end of the reaction, when a pH-value of 5.5 is attained, it is raised to 55°–60°.

In the course of the reaction ethyl acetate is continuously added at such a rate as to avoid the precipitation of the polymer, which becomes increasingly water-insoluble with the increasing esterification. Altogether, 500 cc. ethyl acetate are needed for this purpose until the reaction is terminated, i.e. until the pH-value has sunk to 2.0.

The organic layer is subsequently separated, washed with dilute aqueous sodium hydrogen carbonate solution, then with water. By concentrating the organic phase in vacuo, a high-viscous somewhat yellowish solution is obtained.

Yield: 247 g. polymer solution having a polymer ester content of 45 percent. The yield corresponds to 98 percent of the theoretical; the acid number is 45.8.

After having poured this solution onto glass plates and evaporated the solvent, clear, hard films are obtained. After the addition of peroxides to the solutions, the films can be cross-linked by heating. It is particularly favorable to add heavy metal accelerators, such as cobalt naphthenate, cobalt, octoate and vanadium compounds.

EXAMPLE 2

Polyallyl methacrylate 84 g. (1 mole) polymethacrylic acid are dissolved in 222 g. (1 mole) aqueous potassium hydroxide of 25 percent and 1,400 cc. water. After having added 50 g. sodium hydrogen carbonate, 0.2 g. copper powder, 1.5 g. cuprous chloride and 152 g. (2 moles) allyl chloride, the reaction is run, as described in example 1, by gradually adding about 1 l. ethyl acetate.

343 g. of a nearly colorless, viscous polymer solution having a solid content of 30 percent are obtained which corresponds to a yield of 82 percent of the theoretical; the acid number is 45.9.

EXAMPLE 3

Polymethallyl methacrylate 84 g. (1 mole) polymethacrylic acid are dissolved in 222 g. aqueous potassium hydroxide of 25 percent and 1,200 cc. water. After having added 50 g. sodium hydrogen carbonate, 0.4 g. copper powder, 2.0 g. cuprous chloride and 137 g. methallyl chloride, the reaction is run as described in example 1, by adding gradually about 1 l. ethyl acetate.

225 g. of a yellowish, viscous polymer solution having a solid content of 32.5 percent are obtained, which corresponds to a yield of 52 percent of the theoretical.

EXAMPLE 4

Allyl ester of a copolymer from styrene and maleic anhydride 101 g. (0.5 mole) of a copolymer from styrene and maleic anhydride (1:1) are suspended in 200 cc. water and converted into the potassium salt by adding 56 g. (1 mole) potassium hydroxide. After having added 50 g. sodium hydrogen carbonate, 0.2 g. copper powder, 1.0 g. cuprous chloride and 190 g. allyl chloride, the reaction is run as described in example 1, but with the addition of 200 cc. toluene. After the separation of the organic phase and evaporation of the organic solvent in vacuo, 145 g. (=96 percent of the theoretical) of a solid, yellowish resin are obtained as residue. Iodine number: calculated 184, found: 178.

EXAMPLE 5

Diallyl ester of a copolymer from styrene and maleic anhydride 101 g. (0.5 mole) of a copolymer from styrene and maleic anhydride (1:1) are dissolved in 200 g. allyl alcohol and heated at 80°–90° for 4 hours. After having distilled off, the excess allyl alcohol in vacuo, a brittle resin which is dissolved in 200 cc. toluene remains as a residue. After the addition of 101 g. (0.3 mole) aqueous potassium hydroxide of 25 percent, 150 cc. water, 25 g. sodium hydrogen carbonate, 0.7 g. cuprous chloride, 0.1 g. copper powder and 114 g. (1.5 mole) allyl chloride, the reaction is conducted as described in example 1.

After separation and concentration of the organic phase, 260 g. of a viscous solution having a solid content of 45 percent are obtained which corresponds to a yield of 78 percent of the theoretical. The acid number is 16.8; the iodine number 172, calculated 184.

EXAMPLE 6

Mixed ester from methallyl and allyl of a copolymer from styrene and maleic anhydride 101 g. (0.5 mole) of a copolymer from styrene and maleic anhydride (1:1) are reacted in the known manner with methallyl alcohol to give the polymer monoester. After having distilled off the excess of methallyl alcohol in a vacuum, the acid ester is dissolved in 200 cc. toluene and converted to the corresponding potassium salt by adding 101 g. aqueous potassium hydroxide of 25 percent concentration and 150 cc. water. With the addition of 0.7 g. cuprous chloride, 0.1 g. copper powder 76 g. (1 mole) allyl chloride, the reaction is run as is described in example 1.

After separation and concentration of the organic phase, 266 g. of a viscous solution having a solid content of 49 percent are obtained which corresponds to a yield of 83 percent of the theoretical.

EXAMPLE 7

When operating according to the directions given in examples 5 and 6, the copolymers described in the following table are esterified in step 1 in the known manner and in step 2 according to the claimed process.

It will be understood that this invention is susceptible to further modification and, accordingly, it is desired to comprehend such modifications within this invention as may fall withing the scope of the appended claims.

| Copolymer | Weight ratio of monomers | Alcohol for esterification in Step 1 | Alkali metal salt | Alkenyl halide for esterification in step 2 | Catalyst | Yield, percent |
|---|---|---|---|---|---|---|
| Styrene/maleic anhydride | 1:1 | Monomethylether of ethylene glycol | Potassium | Allyl chloride | Cuprous chloride | 85 |
| | 1:1 | Monobutylether of ethylene glycol | do | do | do | 80 |
| | 1:1 | Ethyl-hexyl alcohol | do | do | do | 76 |
| | 1:1 | Coconut oil alcohol | do | do | do | 78 |
| | 1:1 | Monobutylether of ethylene glycol | do | Methallyl chloride | do | 82.5 |
| | 1:1 | Methallyl alcohol | do | do | do | 85.8 |
| Dipentene/maleic anhydride | 1:1 | Allyl alcohol | do | Allyl chloride | do | 90.5 |
| Vinyl methyl ether/maleic anhydride | 1:1 | do | do | do | do | 83.5 |
| Vinyl methyl ketone/maleic anhydride | 1:1 | do | do | Methallyl chloride | do | 76 |
| Ethyl acid butyl ester methacrylic acid | 55:42 | do | do | Allyl chloride | | 90 |
| Graft copolymer of maleic anhydride onto polyvinyl methyl ether | 5:25 | do | do | do | do | 68 |

What we claim is:

1. A process of esterifying a polymer containing carboxyl groups which comprises reacting said polymer in the form of its alkali metal salt with allyl chloride or methallyl chloride in an aqueous medium and in the presence of a cuprous salt catalyst and a water-immiscible organic solvent, said solvent being a solvent for said esterified polymer and present in a sufficient quantity to keep the esterified polymer in solution.

2. The process of claim 1 wherein said cuprous salt is a member selected from the group consisting of cuprous chloride, cuprous bromide, cuprous iodide, and cuprous cyanide.

3. The process of claim 1 wherein a small quantity of metallic copper is added to the cuprous salt to prevent its oxidation to a cupric salt.

4. The process of claim 1 wherein said 80° is conducted at a temperature of 20°–80° C. in the presence of 0.1–5 percent of a cuprous salt.

5. The process of claim 1 which comprises completing the aforesaid reaction by attaining a pH value of 1-2 at the conclusion of the reaction, whereby the cuprous salt remains in solution in the aqueous phase, and the polymer is recovered free of copper salts.

6. The process of claim 1 wherein said polymer is a copolymer of styrene and maleic anhydride, and the esterification is effected stepwise, by first reacting the copolymer with an alcohol to form the acid ester of said copolymer, and subsequently completing the esterification by reacting the acid ester, in the form of its alkali metal salt, with allyl chloride or methallyl chloride.

7. The process of claim 1 wherein the initial polymer is polyacrylic acid or polymethacrylic acid, the catalyst is a mixture of cuprous chloride and copper powder, the esterifying agent is allyl chloride, the initial reaction medium is aqueous potassium hydroxide; and during the course of the reaction ethyl acetate is continuously added at such a rate as to avoid precipitation of the increasingly esterified polymer, and wherein at the conclusion of the reaction the organic layer containing the esterified polymer is separated from the aqueous layer which contains the catalyst.

* * * * *